(12) United States Patent
Pankratov et al.

(10) Patent No.: US 11,085,330 B2
(45) Date of Patent: Aug. 10, 2021

(54) SEAL AND BEARING ASSEMBLY WITH BEARING OUTER PORTION DEFINING SEAL STATIC PORTION

(71) Applicant: PRATT & WHITNEY CANADA CORP., Longueuil (CA)

(72) Inventors: Maksim Pankratov, Mississauga (CA); Kenneth Parkman, Georgetown (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 155 days.

(21) Appl. No.: 15/898,725

(22) Filed: Feb. 19, 2018

(65) Prior Publication Data
US 2019/0257214 A1   Aug. 22, 2019

(51) Int. Cl.
| | |
|---|---|
| *F01D 25/18* | (2006.01) |
| *F01D 25/16* | (2006.01) |
| *F02C 7/06* | (2006.01) |
| *F16C 27/04* | (2006.01) |
| *F04D 29/059* | (2006.01) |
| *F16C 33/76* | (2006.01) |
| *F16C 33/78* | (2006.01) |
| *F16C 19/06* | (2006.01) |
| *F16C 19/26* | (2006.01) |

(52) U.S. Cl.
CPC ......... *F01D 25/183* (2013.01); *F01D 25/164* (2013.01); *F02C 7/06* (2013.01); *F04D 29/059* (2013.01); *F16C 27/045* (2013.01); *F16C 33/768* (2013.01); *F16C 33/7886* (2013.01); *F05D 2240/55* (2013.01); *F05D 2260/96* (2013.01); *F16C 19/06* (2013.01); *F16C 19/26* (2013.01); *F16C 2360/23* (2013.01)

(58) Field of Classification Search
CPC .... F01D 25/164; F01D 25/183; F16C 27/045; F16C 2360/23; F04D 29/056; F04D 29/059; F04D 29/063; F16J 15/40; F16J 15/447; F16J 15/4472; F02C 7/06; F05D 2240/55
See application file for complete search history.

(56) References Cited

U.S. PATENT DOCUMENTS

| | | | |
|---|---|---|---|
| 3,053,590 A | 9/1962 | Dison, Jr. | |
| 3,909,085 A | * 9/1975 | Wilkinson | ............. F01D 25/16 384/517 |
| 4,378,197 A | 3/1983 | Cattaneo et al. | |
| 4,500,143 A | 2/1985 | Kervistin et al. | |

(Continued)

*Primary Examiner* — Kenneth Bomberg
*Assistant Examiner* — Christopher R Legendre
(74) *Attorney, Agent, or Firm* — Norton Rose Fulbright Canada LLP

(57) ABSTRACT

A seal and bearing assembly having a bearing received within a housing. The bearing is disposed radially outwardly of a shaft and having an inner portion and an outer portion. The outer portion has a protrusion extending at least in an axial direction. An outer diameter of the outer portion is sized to provide a radial gap between the outer diameter and the housing section. The gap receives a film of lubricant for damping movements of the bearing relative to the housing section. A sealing member has a rotating portion configured for rotation with the shaft radially spaced apart from a static portion defined by the protrusion of the bearing outer portion. There is also disclosed a method of operating such an assembly.

17 Claims, 7 Drawing Sheets

(56) References Cited

U.S. PATENT DOCUMENTS

| | | | | |
|---|---|---|---|---|
| 4,502,274 | A | | 3/1985 | Girault |
| 4,558,564 | A | | 12/1985 | Bouiller et al. |
| 4,693,616 | A | * | 9/1987 | Rohra ................ F01D 25/164 |
| | | | | 384/99 |
| 4,768,790 | A | * | 9/1988 | Netzel ................ F16J 15/3464 |
| | | | | 277/377 |
| 5,344,239 | A | * | 9/1994 | Stallone .............. F01D 25/164 |
| | | | | 384/99 |
| 5,433,584 | A | | 7/1995 | Amin et al. |
| 5,603,602 | A | * | 2/1997 | Romani ................ F01D 25/16 |
| | | | | 415/105 |
| 6,413,046 | B1 | | 7/2002 | Penn et al. |
| 6,439,772 | B1 | * | 8/2002 | Ommundson ........ F01D 25/164 |
| | | | | 29/889.2 |
| 8,342,796 | B2 | * | 1/2013 | Spencer .............. F01D 25/164 |
| | | | | 384/99 |
| 2006/0067817 | A1 | * | 3/2006 | Motherwell .......... F01D 9/042 |
| | | | | 415/191 |
| 2007/0154124 | A1 | | 7/2007 | Inoue et al. |
| 2016/0186607 | A1 | | 6/2016 | Witlicki et al. |
| 2017/0058697 | A1 | * | 3/2017 | Copeland ............ F01D 25/164 |
| 2019/0257214 | A1 | * | 8/2019 | Pankratov ........... F01D 25/164 |
| 2019/0277157 | A1 | * | 9/2019 | Snow .................. F01D 21/14 |

* cited by examiner

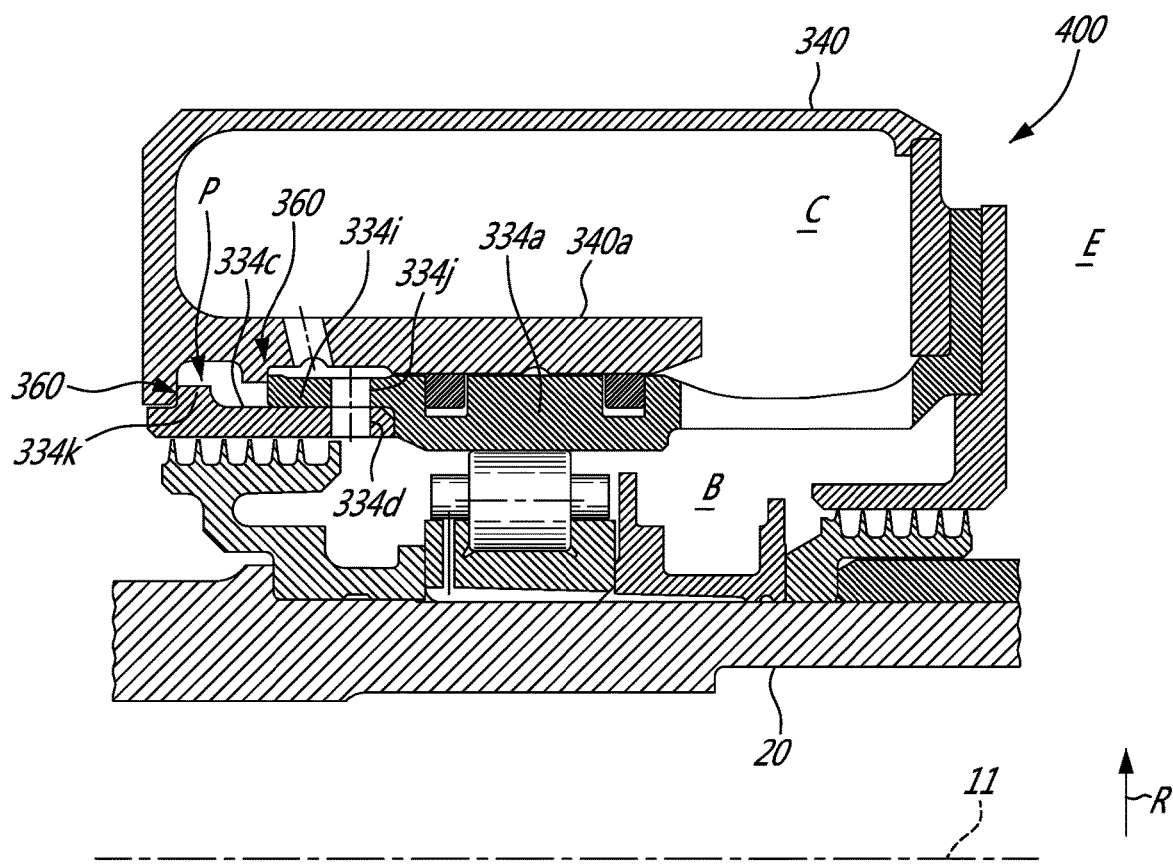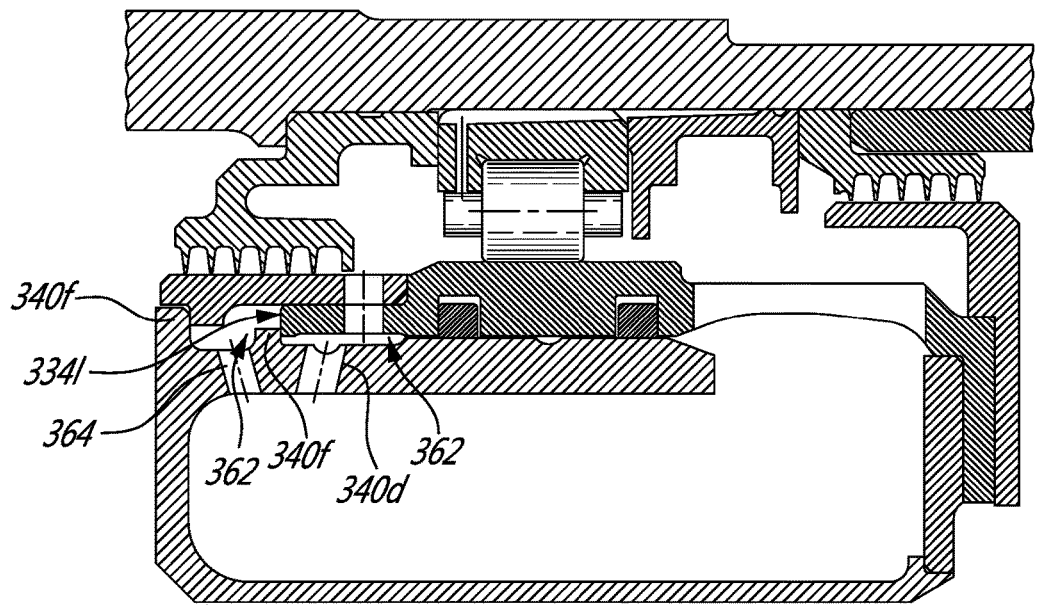
FIG. 5

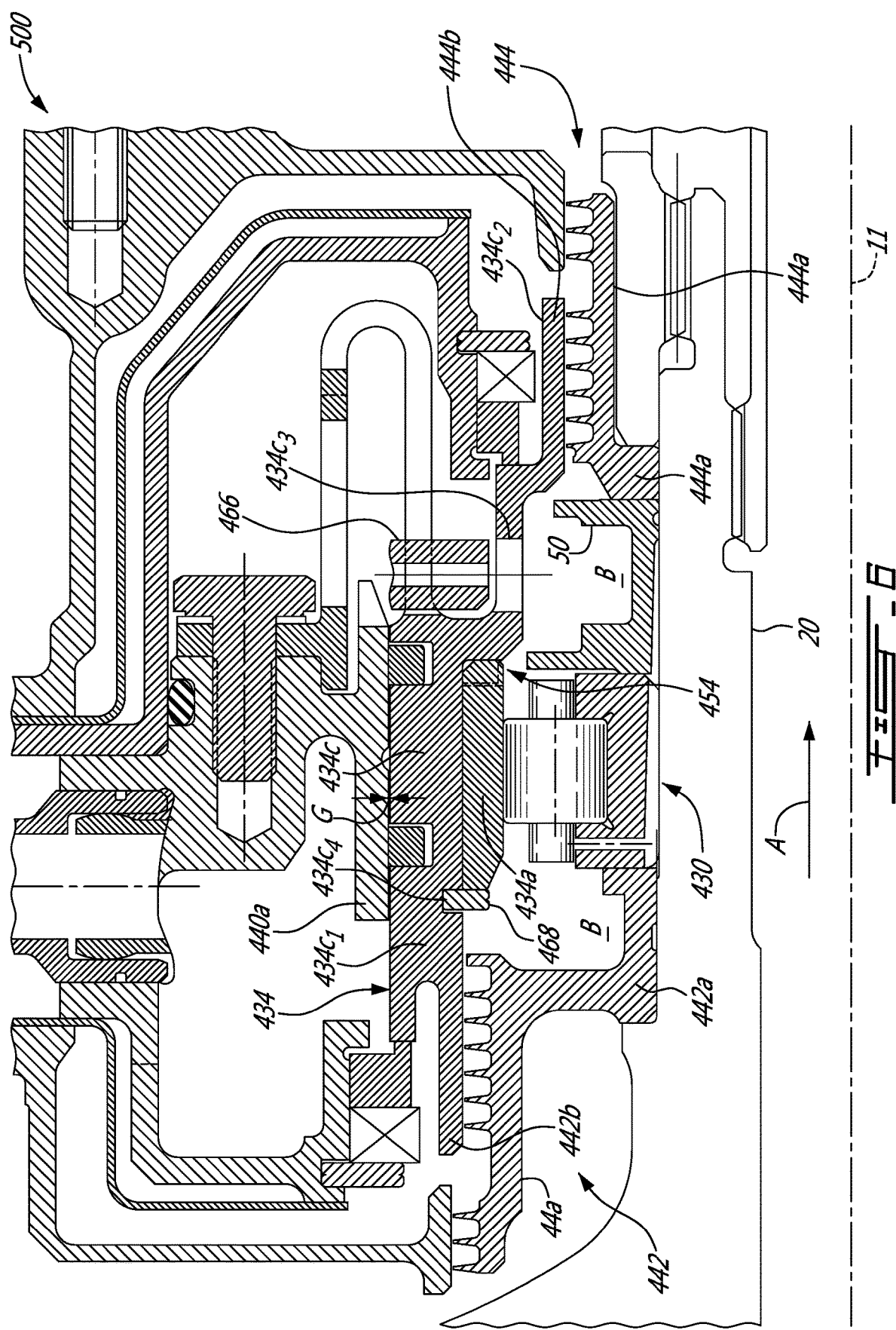

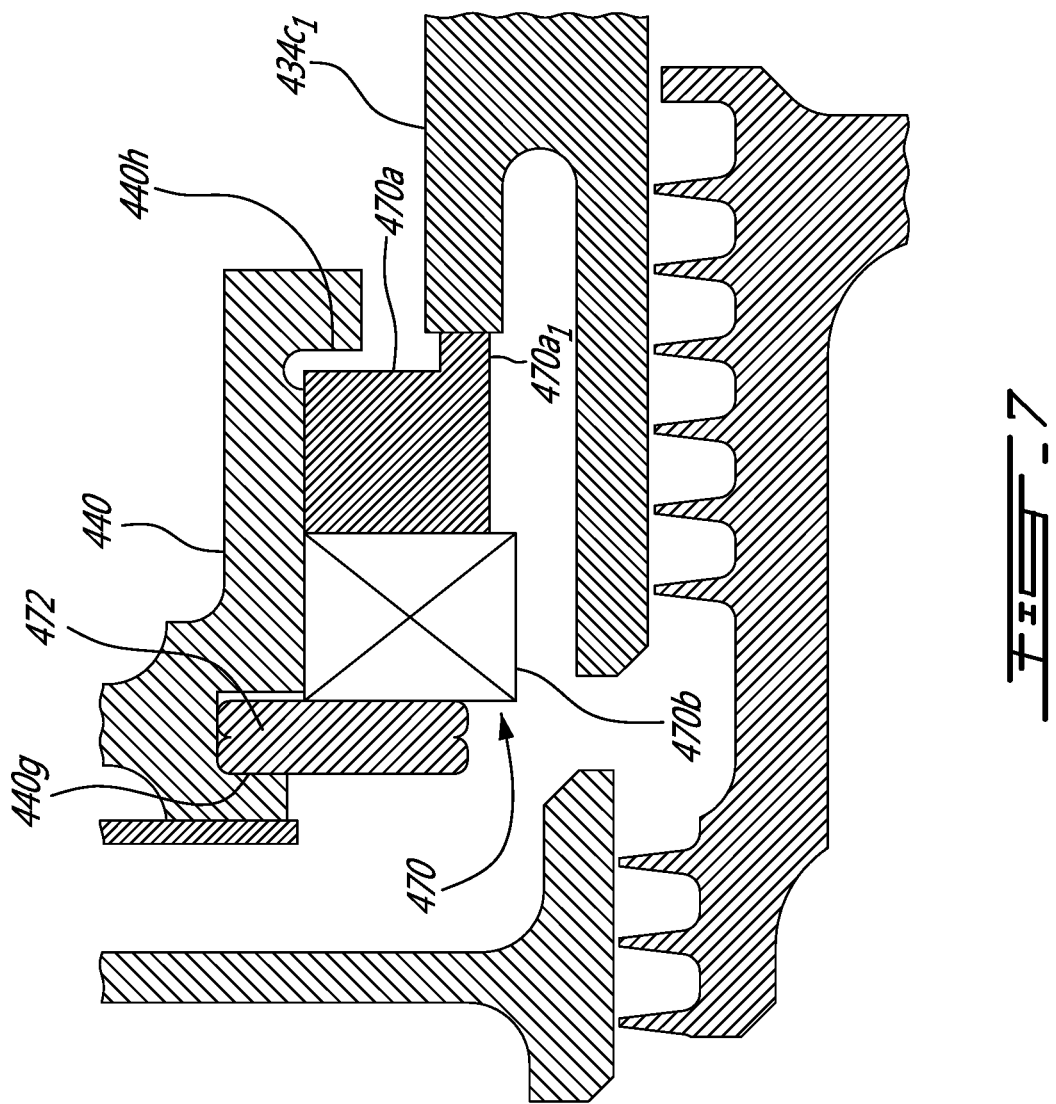

SEAL AND BEARING ASSEMBLY WITH BEARING OUTER PORTION DEFINING SEAL STATIC PORTION

TECHNICAL FIELD

The application relates generally to seals and, more particularly, to an assembly and method used to seal a bearing cavity containing a bearing of a gas turbine engine.

BACKGROUND OF THE ART

Non-contacting seals, such as labyrinth seals, are commonly used in gas turbine engines for sealing bearing cavities containing bearings secured to shafts. Such seals include a rotating part and a static part that are separated from each other by a gap, or clearance. The rotating part is secured to a shaft of the engine and the static part is usually defined by a housing supporting the bearing and defining the bearing cavity. It is desirable to minimize a height of the gap to minimize air leakage toward the bearing cavity. However, rubbing between the static and rotating parts is undesirable.

In some cases, an oil damper is used to dampen movements of the shaft relative to the housing. The oil damper allows movement between the bearing and the housing. As a consequence, the gap of the non-contacting seal must be made bigger to cater to the relative movements between the bearing and the housing such as to limit contact between the rotating and static parts of the seals. However, the bigger gap may impair the seal's efficiency. Thus, there is room for improvement.

SUMMARY

In one aspect, there is provided a seal and bearing assembly comprising at least one bearing and at least one sealing member, the bearing configured to be received within a housing and disposed radially outwardly of a shaft relative to a rotation axis of the bearing, the bearing having an inner portion and an outer portion, the inner portion configured for rotating integrally with the shaft, the inner portion rotatable relative to the outer portion about the rotation axis, the outer portion having a protrusion extending at least in an axial direction relative to the rotation axis; an outer diameter of the outer portion sized to provide a gap between the outer diameter and the housing, the gap sized to receive a film of lubricant adapted in use to damp movements of the bearing relative to the housing, the sealing member having a rotating portion configured for rotation with the shaft radially spaced from a static portion, the static portion defined by the protrusion of the bearing outer portion.

In another aspect, there is provided a gas turbine engine comprising an engine casing extending circumferentially around a rotation axis, the engine casing defining a housing; a shaft rotatable about the rotation axis; and a seal and bearing assembly disposed between the housing and the shaft, the assembly having at least one bearing and at least one sealing member, the bearing received within a section of the housing, the bearing disposed radially outwardly of the shaft relative to the rotation axis and radially inwardly of the section of the housing, the bearing having an inner portion and an outer portion, the inner portion rotating integrally with the shaft, the inner portion rotatable relative to the outer portion about the rotation axis, the outer portion having a protrusion located radially inwardly of the section of the housing, the protrusion having a remote end axially spaced apart from the inner portion of the bearing; an outer diameter of the outer portion sized to provide a gap between the outer diameter and the housing, the gap sized to receive a film of lubricant adapted in use to damp movements of the bearing relative to the section; the sealing member having a rotating portion and a static portion, the rotating portion rotating with the shaft, the rotating portion radially spaced apart from the static portion, the static portion defined by the protrusion of the bearing outer portion.

In yet another aspect, there is provided a method of operating a seal and bearing assembly, comprising: rotating an inner portion of a bearing relative to an outer portion thereof; damping movements of the bearing relative to a housing section receiving the bearing by squeezing a film of lubricant disposed within a gap between the outer portion and the housing section; and sealing a bearing cavity from an environment outside the bearing cavity with a cooperation of a protrusion of the outer portion of the bearing and a rotating portion of a sealing member.

DESCRIPTION OF THE DRAWINGS

Reference is now made to the accompanying figures in which:

FIG. 5 is a schematic cross-sectional view of a seal and bearing assembly in accordance with another embodiment, FIG. 6 is a schematic cross-sectional view of a seal and bearing assembly in accordance with another embodiment, and FIG. 7 is a schematic cross-sectional view of a portion of the seal and bearing assembly of FIG. 6.

DETAILED DESCRIPTION

Figure 1:
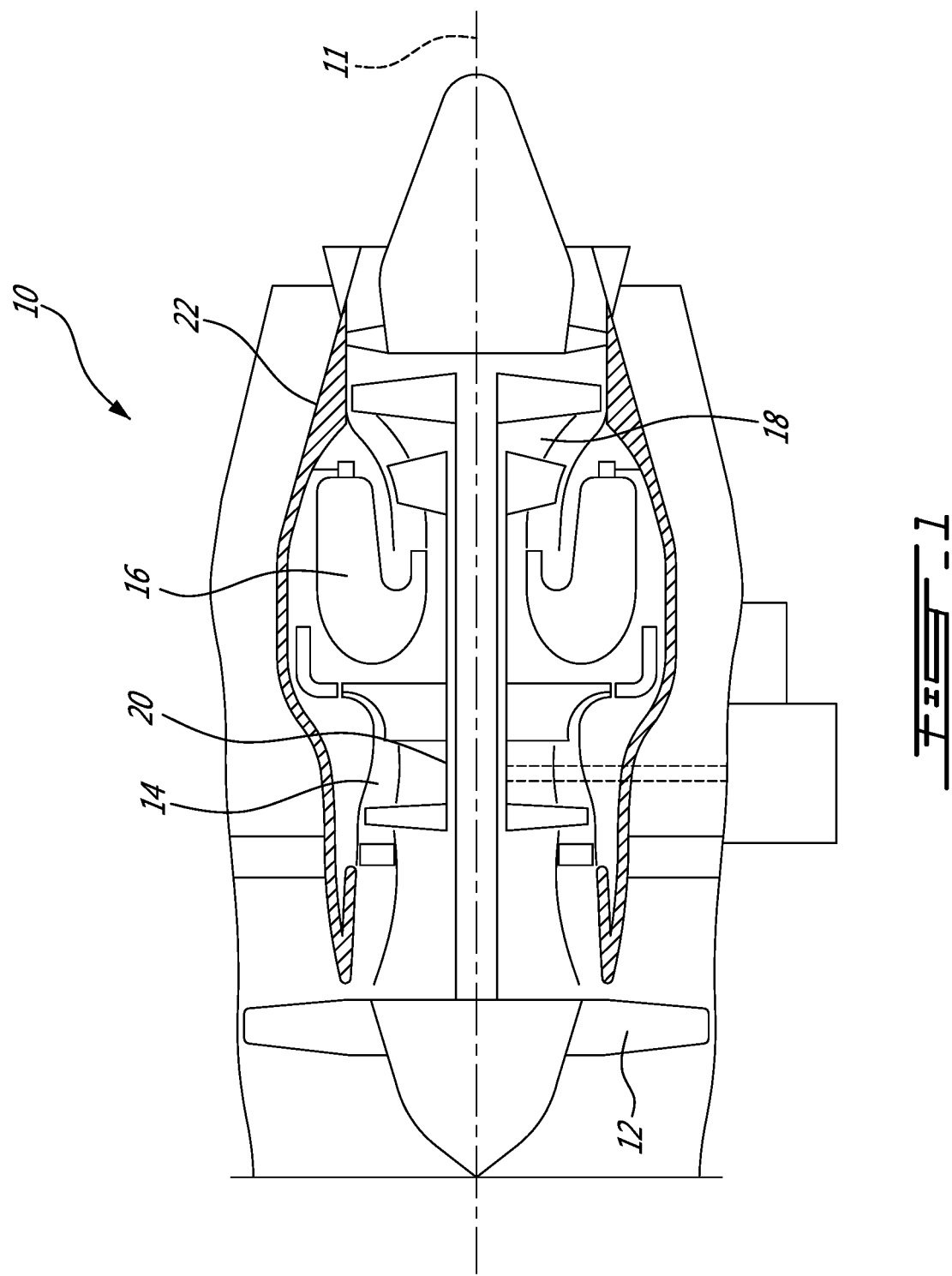
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotating about a rotation axis 11 of the gas turbine engine 10. The gas turbine engine 10 includes an engine shaft 20 and an engine casing 22 disposed circumferentially around the engine shaft 20. The engine casing 22 is in part used to support the engine shaft 20.

A gas turbine engine 10 such as shown in FIG. 1 can include a plurality of bearings to provide a low-friction interface between components which rotate relative to one another, such as between the engine shaft 20 the engine casing 22. Typically, bearings may be enclosed in chambers referred to as bearing cavities, and the bearing cavities are partitioned from an environment, which can be of significantly higher pressure, by seals on each axial side.

Figure 2:
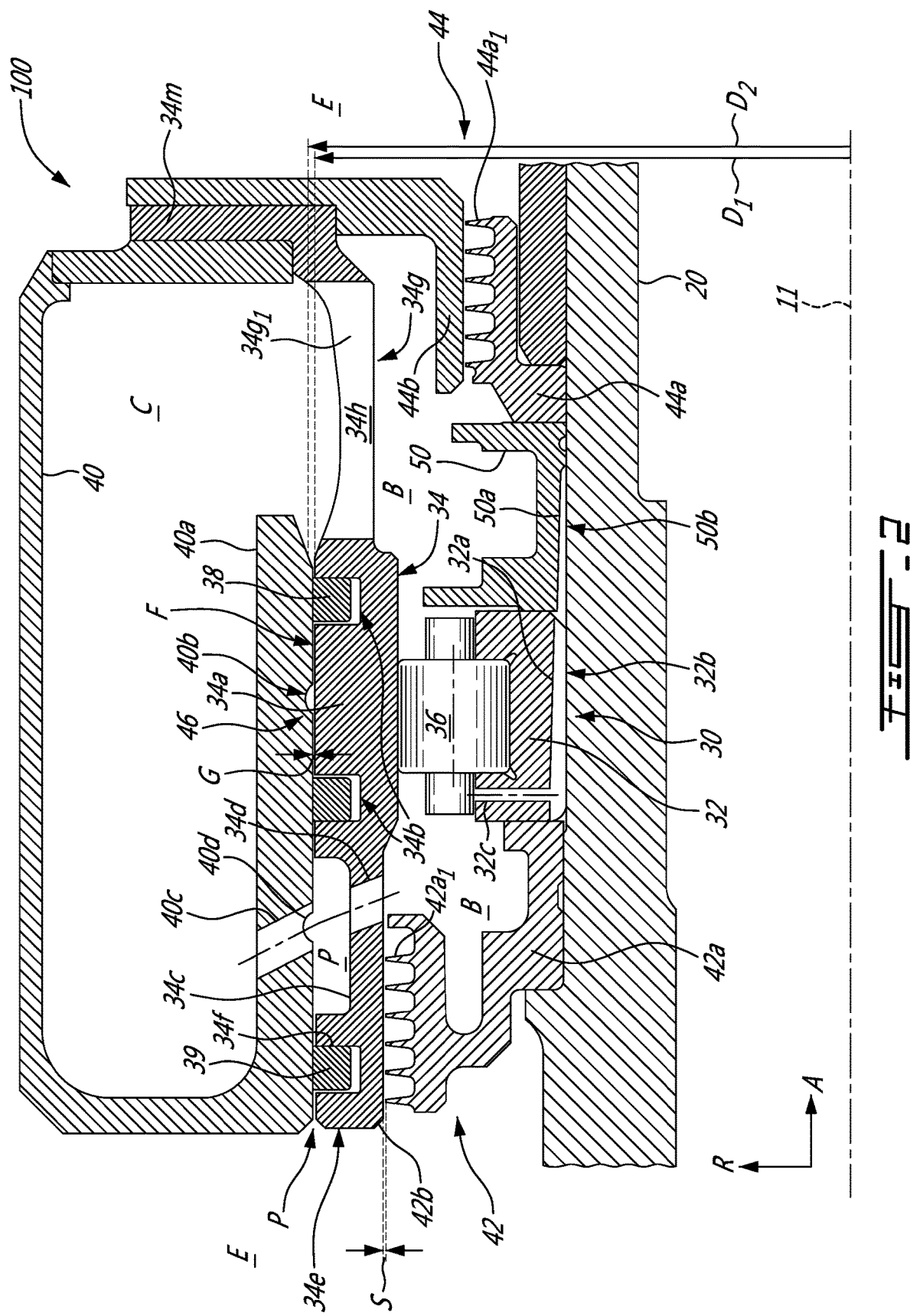
FIG. 2 is a schematic cross-sectional view of a seal and bearing assembly in accordance with one embodiment.

Referring now to FIG. 2, a seal and bearing assembly is shown at 100. FIG. 2, and all ensuing figures are upper views of annular components, hence the assembly portions shown in the figures have a counterpart assembly about the rotation axis 11. However, for simplicity of the figures and to avoid a redundancy of details, the views (expect for FIG. 5) are limited to the upper half. The seal and bearing assembly 100 includes a bearing 30. The bearing 30 has an inner portion 32 and an outer portion 34. The inner portion 32 may correspond to an inner ring of the bearing 30 that is secured to the shaft 20 for integral rotation therewith. The outer portion 34 may include an outer ring 34a of the bearing 30. In the embodiment shown, rolling elements 36 (e.g., balls, cylinders) are received and held captive between the inner portion 32 and outer ring 34a of the bearing 30.

In the embodiment shown, the bearing outer portion 34 defines two annular grooves 34b that circumferentially extend around the rotation axis 11 and face radially away from the rotation axis 11. The grooves 34b receive therein static seals 38. As illustrated, the static seals 38 are piston rings, but may be O-rings, wipers, or any type of seal. The static seals 38 are compressed such that they are biased in an abutment contact with a structure surrounding said bearing outer portion 34.

In the embodiment shown, a housing 40 extends circumferentially around the axis 11. The housing 40 may define a chamber C that may contain lubricant. The housing 40 may be secured to the engine casing 22 or may be structurally part of the engine casing 22. As shown, the bearing 30 is received within the housing 40. More specifically, the housing 40 has a section 40a that is disposed radially outwardly of the bearing 30 relative to the rotation axis 11. The bearing 30 is received within and supported by the section 40a of the housing 40 by being disposed radially inwardly to the section 40a relative to the rotation axis 11.

The assembly 100 defines a bearing cavity B that is located radially inwardly of the housing section 40a and that may be in fluid flow communication with the housing chamber C. To limit lubricant leakage, the bearing cavity B is sealed from an environment E outside the bearing cavity B and outside the chamber C. In the embodiment shown, fore and aft sealing members 42, 44 are disposed on opposite sides of the bearing 30. The bearing cavity B extends axially between the fore and aft sealing members 42, 44 and radially between the shaft and the housing section 40a. The bearing 30 is located in the bearing cavity and axially between the sealing members 42, 44 relative to the rotation axis 11. The sealing members 42, 44 are used to maintain a pressure differential between the environment E and the bearing cavity B; a pressure of the environment E being greater than a pressure of the bearing cavity B to limit lubricant from escaping out of the bearing cavity C.

Each of the sealing members 42, 44, which are labyrinth seals in the embodiment shown, includes rotating portions 42a, 44a and static portions 42b, 44b. Although labyrinth seals are shown, other seal types can be used, including a wiper seal, knife seal, etc. As shown, the rotating portions 42a, 44a are secured to the shaft 20 for integral rotation therewith. The rotating portions 42a, 44a define one or a plurality of knifes $42a_1$, $44a_1$ (a plurality shown) or rims extending radially outwardly away from the shaft 20 relative to the axis 11. The rotating portions 42a, 44a rotate relative to the static portions 42b, 44b about the axis 11. Spacing S is defined between the rotating portions 42a, 44a and the static portions 42b 44b. The spacing S is kept small to maintain the pressure differential between the bearing cavity B and the environment E. It is understood that the knifes $42a_1$, $44a_1$ may be defined by the static portions 42b, 44b rather than by the rotating portions 42a, 44a. Other seal configurations are contemplated.

In operation, the shaft 20 of the gas turbine engine 10 may vibrate. For example, the resulting vibrations are the result of an eccentricity of a center of mass of components (e.g., compressor, turbine) rotating with the shaft 20 relative to the rotation axis 11. It might be advantageous to damp these vibrations, for instance, to decrease a noise level of the gas turbine engine 10. Herein, damping means that an amplitude of the vibrations is decreased.

In the embodiment shown, an oil damper 46 is used to damp these vibrations such as to limit a propagation of the vibration from the shaft 20 and bearing 30 to the engine casing 22. The oil damper 46 is defined by a gap G that is located radially between the bearing outer portion 34 and the section 40a of the housing 40. In the embodiment shown, the gap G is between the housing section 40a and the bearing outer ring 34a. The gap G is created by an outer diameter $D_1$ of the outer portion 34 that is less than an inner diameter $D_2$ of the housing section 40a.

The damping effect is created by a film of lubricant F that is received within the gap G and is kept axially between the two static seals 38. Movements of the bearing 30 relative to the housing section 40a are dampened by the film of lubricant that absorbs at least a portion of said movement. Therefore, the film of lubricant damps movements of the bearing 30 relative to the housing 40 such that an amplitude of movements of the housing 40 may be less than an amplitude of movements of the bearing 30 or shaft 20. The oil damper 46 may reduce transmissibility of the vibration from the engine shaft 20 to the housing 40 so that vibratory displacement of the housing 40 might be less than the vibratory displacement of the shaft 20. The oil damper 46 might absorb the vibration energy from the shaft 20 and might reduce the amplitude of the shaft vibration. In a particular embodiment, this is beneficial for reduction of the shaft vibratory stress level, turbine 18 and compressor 14 tip clearances, aircraft cabin noise, vibration levels, and seals and bearings performance.

As illustrated, the housing 40 defines an annular groove 40b at the housing section 40a. The annular groove 40b extends circumferentially around the rotation axis 11 and is used for containing lubricant. The annular groove 40b may receive oil therein from a main pressure oil pump (not shown) of the engine 10. The annular groove 40b might distribute the lubricant evenly all around the oil damper gap G. The static seals 38 might limit lubricant leakage from the gap G toward the housing chamber C. The static seals 38 might be required to ensure that the gap G remains filled with lubricant all around the axis 11. The static seals 38 might limit an amount of pressurized lubricant leakage from the oil damper 46 that might cause a reduction of a main oil pressure of the engine 10.

It might be preferable that movements of the bearing outer portion 34 relative to the housing 40 do not affect the spacing S between the rotating and static portions 42a, 42b of the fore sealing member 42. The amplitude of movements of the rotating portion 42a of the sealing members 42 corresponds substantially to that of the shaft 20. It might be advantageous to couple movements of the bearing 30, which are in part due to the shaft vibrations, with movements of the static portion 42b of the fore sealing member 42 so that an amplitude of the movements of both portions 42a, 42b of the fore sealing member 42 is similar. This might allow a height of the spacing S, taken in a radial direction R relative to the axis 11, to remain more or less constant throughout vibrations of the shaft 20.

In the embodiment shown, the static portion 42b of the fore sealing member 42 is defined by the outer portion 34 of the bearing 30. More specifically, the bearing outer portion 34 has a protrusion 34c that extends at least in an axial direction A relative to the rotation axis 11. The protrusion 34c is located radially inwardly to the housing section 40a relative to the rotation axis 11. As shown, the protrusion 34c extends away from the bearing outer ring 34a and away from the aft sealing member 44. The protrusion 34c defines the static portion 42b of the fore sealing member 42. In the depicted embodiment, the bearing outer ring 34a and the protrusion 34c are integral in that they are made of a sole monoblock piece of material. As discussed herein below, other configurations are contemplated, which configurations have the static portion 42b rigidly and directly connected to the outer ring 34a of the bearing 30, as opposed to being defined by the housing 40 and separated from the outer ring 34a by the fluid gap of the oil damper 46. In the embodiment shown, a corrosion protective coating may be applied on the static portion 42b of the fore sealing member 42.

Because the fore sealing member static portion 42b corresponds to the bearing outer portion protrusion 34c, an amplitude of the movements of the bearing inner portion 32 and of the fore sealing member rotating portion 42a generally corresponds to that of the bearing outer portion 34 and of the fore sealing member static portion 42b, and hence of the protrusion 34c. In a particular embodiment, such a configuration allows the height of the spacing S to generally remain constant throughout vibrations of the shaft 20. In a particular embodiment, and in other words, such a configuration allows the height of the spacing S between the fore sealing member static and rotating portions 42a, 42b to be independent of a variation of a height of the gap G taken in the radial direction.

The aft sealing member static portion 44b is secured to the housing 40. Hence, a spacing S between the aft sealing member rotating and static portions 44a, 44b may be greater than the spacing S between the fore sealing member rotating and static portions 42a, 42b.

In the embodiment shown, the housing section 40a and the bearing outer portion 34 define each circumferentially spaced ventilating apertures 40c, 34d for ventilating the bearing cavity C. Central axes of the housing ventilating apertures 40c might be coincident with central axes of the outer portion ventilating apertures 34d. In the depicted embodiment, the central axes define an angle relative to the rotation axis 11 of the shaft 20. In a particular embodiment, bearing outer ring coning caused by a thermal grading within the bearing outer portion 34 might be reduced by a cooling effect created by a passage of lubricant and air through the ventilating apertures 40c, 34d.

The ventilating apertures 40c, 34d are located axially between a remote end 34e of the bearing outer portion 34 and the bearing outer ring 34a. The remote end 34e is axially spaced apart from the bearing inner portion 32 relative to the rotation axis 11. A static seal is provided to limit lubricant leakage via a passage P between the housing 40 and the remote end 34e. The static seal 39 is received within an annular groove 34f defined by the protrusion 34c. The static seal 38 is biased in an abutment contact with the housing section 40a. The static seal 39 might reduce an amount of pressurized air leakage into the chamber C. Lubricant leakage might be prevented by having a pressure of the environment E greater than that within the bearing cavity B and housing chamber C. In the illustrated embodiment, pressurized air from the environment E enters the cavity and chamber B, C so that lubricant might not flow against a flow of pressurized air entering the cavity and chamber B, C. However, it is desirable to limit an amount of air entering the cavity and chamber B, C. The amount of pressurized air from the environment E entering the cavity and chamber B, C might be minimized by the seals 42, 44 and the static seal 39.

In the illustrated embodiment, an inner side of the housing section 40a defines a lubricant collecting groove 40d that extends circumferentially around the axis 11. The lubricant collecting groove 40d is axially aligned with the ventilating apertures 40c and is in fluid flow communication with said ventilating apertures 40c. The collecting groove 40d is used for accumulating and draining lubricant through the ventilating apertures 40c. The lubricant collecting groove 40d receives pressurized lubricant from the engine main pressure oil pump (not shown). The groove 40d might distribute the lubricant evenly all around the oil damper gap G. The ventilation apertures 40c and 34d provide fluid communication between a portion of the bearing cavity B that is axially forward of the bearing 30 with the housing chamber C so that lubricant might escape from this portion of the bearing cavity B into the housing chamber C. This might preclude the lubricant from overheating and hence might preclude oil coking. By gravity, the lubricant is collected at a bottom of the housing chamber C from where this lubricant might be scavenged through an oil scavenge tube (not shown).

During operation, the bearing 30 requires lubrication. In the embodiment shown, a scoop 50 is secured to the shaft 20 for integral rotation therewith and is located adjacent the bearing 30. In rotation, the scoop 50 is used for receiving the lubricant. The scoop 50 may have grooves 50a that, with the shaft 20, define together circumferentially spaced channels 50b that are tapered such that a centrifugal force pushes the lubricant that has been received by the scoop 50 in the axial direction A relative to the axis 11 toward the bearing 30.

An inner side of the bearing inner portion, or inner ring, 32 may have grooves 32a that extend in the axial direction. The grooves 32a are circumferentially spaced and cooperate with the shaft 20 in defining circumferentially spaced channels 32b that are configured for receiving lubricant therein. The inner ring channels 32b are in fluid flow communications with the scoop channels 50b. As shown, each of the inner ring channels 32b is in fluid communication with a respective one of circumferentially spaced radial conduits 32c that are defined through the bearing inner portion 32. The radial conduits 32c are fluidly connected to a volume defined by the bearing inner portion 32 and that is configured for rollingly receiving the bearing rolling elements 36.

Once the lubricant is trapped by the scoop 50, it may flow within the scoop channels 50b toward the bearing 30, to then flow within the bearing inner ring channels 32b toward the radial conduits 32c, and then flow within the radial conduits 32c for being routed in the volume.

As for the scoop channels 50b, the bearing inner ring channels 32b may be tapered such that a radial depth increases in the axial direction A toward the radial conduits 32c. In rotation, the tapering of the channels 50b, 32b combined with centrifugal force push the lubricant toward the radial conduits 32c. Once the lubricant enters the radial conduit 32c, the centrifugal force pushes the lubricant radially away from the shaft 20 to feed the lubricant to the volume containing the bearing rolling elements 36.

In the embodiment shown, the bearing outer portion 34 may include a bearing squirrel cage 34g that is secured to the housing 40. The bearing squirrel cage 34g defines openings 34h that are circumferentially spaced around the axis 11. The bearing squirrel cage 34g is used for providing flexibility. More specifically, the squirrel cage 34g allows radial movement of the bearing outer ring 34a relative to the housing 40. The squirrel cage 34g consists of plurality of the axial beams 34g$_1$ located between adjacent openings 34h and that connect the bearing outer ring 34a with a bearing flange 34m that extends radially outwardly from an axially rearward end of the squirrel cage 34g. The bearing flange 34m might be rigidly attached to the housing 40 (e.g., by bolts). When radial movements of the shaft 20 occur (e.g., vibration), the bearing inner ring 32 might move together with the shaft 20 and might push the rolling elements 36, which might push the outer ring 34a. The squirrel cage beams 34g$_1$ might bend. Bending stiffness of the squirrel cage beams 34g$_1$ is selected to maintain highest possible efficiency of the oil damper 46. The squirrel cage 34g and the bearing outer ring 34a might be integral for instance by being made from a same piece of material. Other configurations are contemplated.

Figure 3:
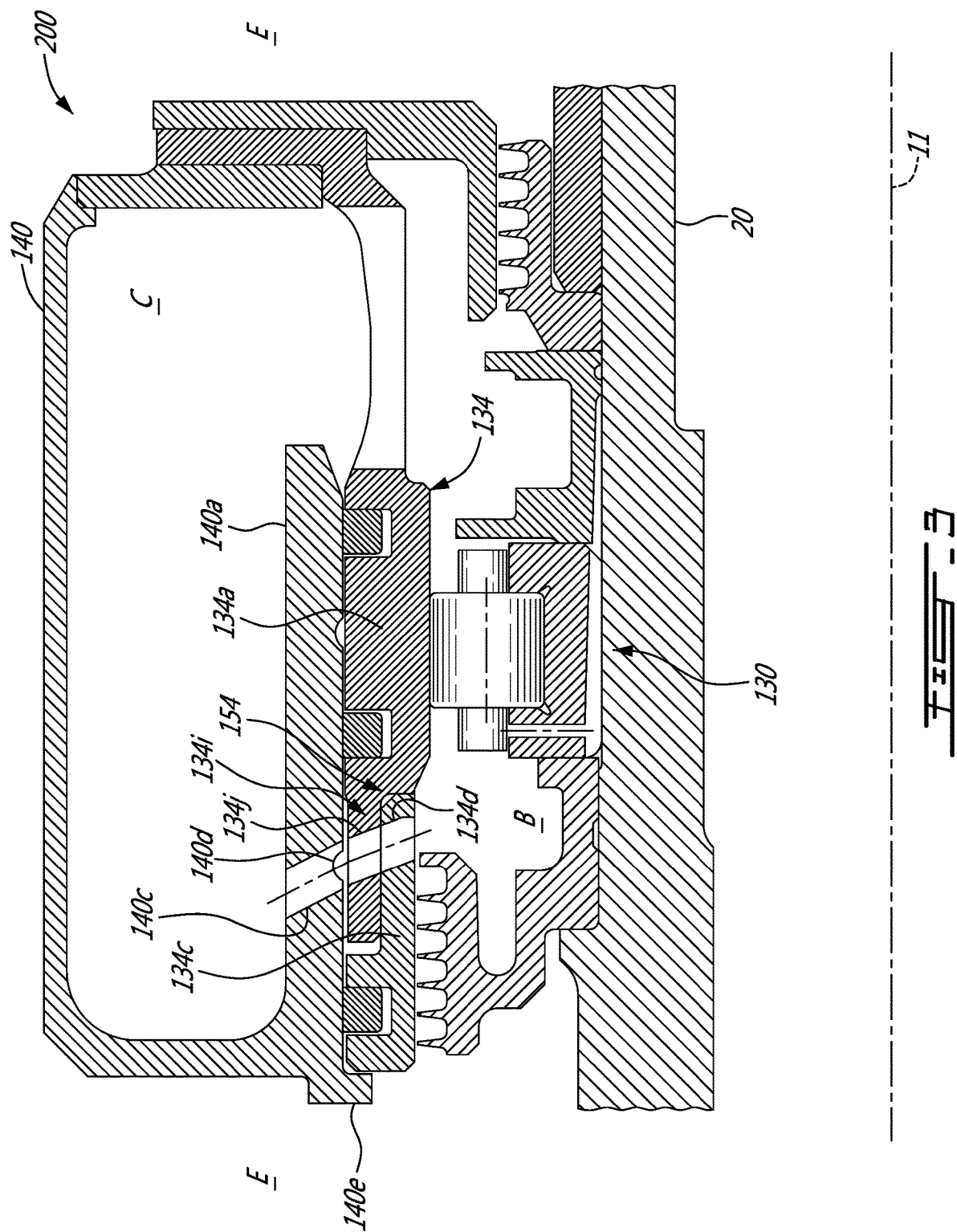
FIG. 3 is a schematic cross-sectional view of a seal and bearing assembly in accordance with another embodiment.

Referring now to FIG. 3, another embodiment of a seal and bearing assembly is shown at 200. For the sake of conciseness, only elements that are different than those described with respect to the assembly of FIG. 2 are described herein below.

In the embodiment shown, the bearing outer portion 134 includes the bearing outer ring 134a and the protrusion 134c. The bearing outer ring 134a defines a tab 134i that extends at least in the axial direction, whereby the bearing outer ring 134a and the protrusion 134c are rigidly connected for concurrent movement. The protrusion 134c is secured to the bearing outer ring tab 134i. In the embodiment shown, the protrusion 134c and the tab 134i are maintained secured with each other via a tight fit engagement therebetween. Other configurations are contemplated.

In such an embodiment, the bearing outer ring tab 134i define circumferentially spaced ventilating apertures 134j that are aligned with the ventilating apertures 134d of the protrusion 134c and the apertures 140c of the housing section 140a. Central axes of the tab ventilating apertures 134j might be coincident with central axes of apertures 134d, 140c of the protrusion 134c and housing 140.

To maintain an axial position of the protrusion 134c relative to the bearing outer ring 134a, the housing 140 defines an axial retention shoulder 140e. The shoulder 140e extends radially inwardly toward the shaft 20. As illustrated, axial movements of the bearing protrusion 134c relative to the bearing 130 are limited by a cooperation of the housing shoulder 140e and the bearing outer ring 134a.

In the depicted embodiment, a rotation of the bearing outer ring 134a relative to the protrusion 134c is limited by slots and lugs arrangements 154 that are circumferentially distributed around the rotation axis 11. Other configurations are contemplated.

Figure 4:
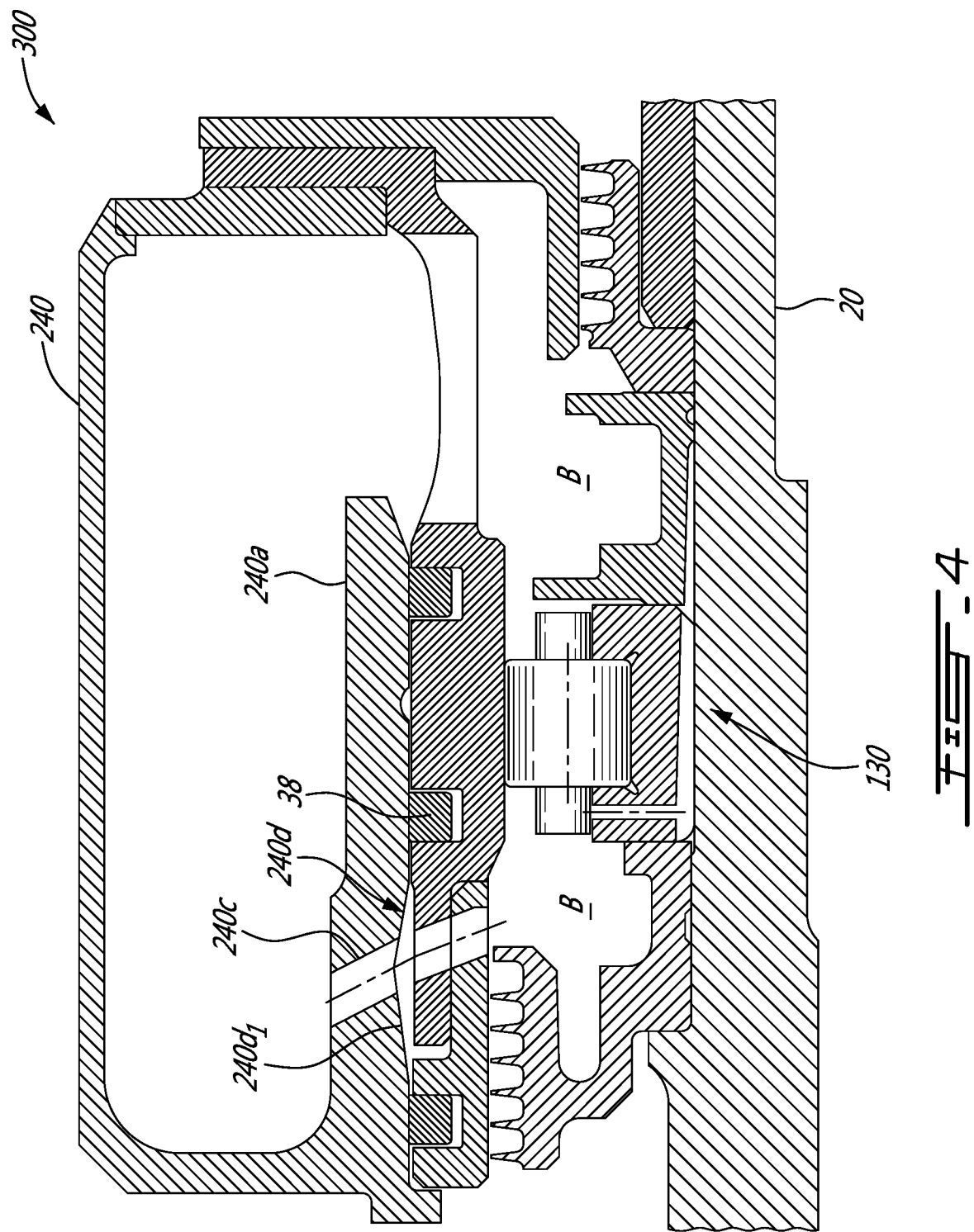
FIG. 4 is a schematic cross-sectional view of a seal and bearing assembly in accordance with another embodiment.

Referring now to FIG. 4, another embodiment of a seal and bearing assembly is shown at 300. For the sake of conciseness, only elements that are different than those described with respect to the assembly of FIGS. 2-3 are described herein below. In the embodiment shown, the lubricant collecting groove 240d that is defined through the housing section 240a of the housing 240 is provided in the form of two conical slopes 240d$_1$ that converge toward the central axes of the housing ventilating apertures 240d. Similarly to the groove 140d of the embodiment of FIG. 3, the present groove 240d is used to collect lubricant and to guide said lubricant toward the ventilating apertures 240d. In a particular embodiment, a risk of lubricant coking near the static seals 38 is reduced by collecting and draining oil via the ventilating apertures 240c compared to a configuration lacking such groove 240d or a configuration having a rounded groove as the one illustrated in FIG. 3.

Referring now to FIG. 5, another embodiment of a seal and bearing assembly is shown at 400. For the sake of conciseness, only elements that are different than those described with respect to the assembly of FIG. 3 are described herein below.

In the embodiment shown, sealing between the housing section 340a and the bearing outer portion protrusion 334c is provided by minimizing axial gaps 360. More specifically, the housing section 340a defines two radial tabs 340f extending in the radial direction R toward the shaft 20. The bearing protrusion 334c defines a radial tab 334k that extends in the radial direction R away from the shaft 20.

A first one of the axial gaps 360 is defined axially between a first one of the housing section radial tabs 340f and by the radial tab 334k of the bearing protrusion 334c. A second one of the axial gaps 360 is defined axially between a remote end 334l of the bearing outer ring tab 334i and a second one of the housing section radial tabs 340f. The first and second axial gaps 360 are axially offset from each other relative to the axis 11.

In the depicted embodiment, the first of the axial gaps 360 has tighter tolerance control than the second one of the axial gaps 360 to limit an air flow coming into the bearing cavity C from the environment E outside the bearing cavity C. This tight tolerance might be achieved by precise machining of parts or by having a sealing member static portion of higher length than illustrated.

In the embodiment shown, two chambers 362 are defined within the passage P located radially between the bearing protrusion 334c and the housing section 340a and that extend circumferentially around the rotation axis 11. A first one of the two chambers 362 extends between the axial gaps 360. A second one of the two chambers 362 extends between the second one of the axial gaps 360 and the bearing outer ring 334a. The ventilating apertures 340d of the housing section 340a fluidly connect the second one of the chambers 362 to the bearing cavity C.

As shown, the ventilating apertures 340d of the housing section 340a are offset from the apertures 334j, 334d of the bearing outer ring tab 334i and protrusion 334c. It is understood that the bearing outer ring tab 334i and protrusion 334c may be unitary without departing from the scope of the present disclosure.

In the embodiment shown, the housing section 340a defines a drain hole 364 that fluidly connects the first one of the chambers 362 to the bearing cavity C so that excess lubricant may be flushed out of the first of the chambers 362 when air pressure increases. The drain hole 364 is located on a lower halve of the housing 340 such that the lubricant flows toward said hole 364 by gravity.

In a particular embodiment, using axial gaps instead of static seals (e.g., piston rings, O-rings) eliminates wear that would otherwise occur with static seals. Hence, the assembly having axial gaps might require less maintenance than an assembly with static seals.

Referring now to FIGS. 6-7, another embodiment of a seal and bearing assembly is shown at 500. For the sake of conciseness, only elements that are different than that described with respect to the assembly of FIG. 2 are described herein below.

In the embodiment shown, the bearing outer portion 434 includes the bearing outer ring 434a and a two-sided protrusion 434c that extends circumferentially around the rotation axis 11. The bearing outer ring 434a is disposed radially inwardly to the two-sided protrusion 434c and the axial gap G is defined between the two-sided protrusion 434c and the housing section 440a.

As illustrated, the static portions 442b, 444b of each of the two sealing members 442, 444 are defined by the two-sided protrusion 434c. More specifically, the two-sided protrusion 434c defines a fore section $434c_1$ and an aft section $434c_2$ extending on opposite sides of the bearing 430 and both extending at least in the axial direction A in opposite direction away from the bearing outer ring 434a. The rear protrusion $434c_2$ defines circumferentially spaced apertures $434c_3$ that are configured to allow lubricant ejected from a nozzle 466 to flow toward the scoop 50.

In the depicted embodiment, a rotation of the bearing outer ring 434a relative to the two-sided protrusion 434c is limited by slot and lug arrangements 454 that are circumferentially distributed around the rotation axis 11. Other configurations are contemplated. As shown, the slot and lug arrangements 454 are located on a rear side of the bearing outer ring 434a. To limit an axial movement of the two-sided protrusion 434c relative to the bearing outer ring 434a, a retaining ring 468 is located at the fore section $434c_1$ of the protrusion 434c and is received within an annular groove $434c_4$ defined by the protrusion fore section $434c_1$. The retaining ring 468 protrudes radially inwardly so that it abuts axially against the bearing outer ring 434a.

Referring more particularly to FIG. 7, to limit an airflow between the housing 440 and the two-sided protrusion 434c, two seals 470 are used, only one of which is described herein below as they are, in the embodiment shown, identical.

The seal 470 includes a static seal 470a (e.g., piston ring) and a biasing member 470b (e.g., wave spring). As shown, the static seal 470a and the biasing member 470b are disposed axially between a retaining ring 472, which is received within a groove 440g defined by the housing 440, and the fore section $434c_1$. The biasing member 470b is used to push on the static seal 470a to create an abutment contact between the fore section $434c_1$ and the static seal 470a.

The vibrations discussed herein above might cause the static seal 470a, which may be made of a softer material than that of the two-sided protrusion 434c, to wear with time. To cater to this wear, the static seals 470a define a wearable nose $470a_1$ that is designed to wear way with time. As the wearable nose $470a_1$ wears, the static seal 470a moves axially toward the two-sided protrusion 434c because it is pushed by the biasing member 470b. At some point, the wearable nose $470a_1$ is sufficiently worn away such that the static seal 470a abut against a radial shoulder 440h of the housing 440. Stated otherwise, the radial shoulder 440h acts as a stopper. At this time, a contact pressure between the static seal 470a and the protrusion 434c decreases and the wearable nose might stop to wear. At this point, the static seal 470a is worn-in and might keep a zero gap between the static seal 470a and the two-sided protrusion 434c to maintain a sealing function.

Referring to FIG. 2, for operating the seal and bearing assembly 100, the inner portion 32 of the bearing 30 is rotated relative to the outer portion 34 thereof. Movements of the bearing 30 relative to the housing section 40a are damped by squeezing a film of lubricant disposed within the gap G between the bearing 30 and the housing section 40a. The bearing cavity C is sealed with a cooperation of the protrusion 34c of the outer portion 34 of the bearing 30 and the rotating portion 42a of the fore sealing member 42.

In the embodiment shown, fluid flow communication between the bearing cavity C and the environment E outside the bearing cavity C is limited by sealing the passage P, which is located between the housing 40 and the protrusion 34, from the environment E.

As shown in FIG. 5, fluid flow communication between the environment E and the bearing cavity C, within the passage P, is limited by constricting said passage with the axial gaps 360 that are located between the housing 340 and the protrusion 334c.

As shown in FIG. 6, the bearing cavity C is sealed from the environment E on opposite sides of the bearing 30 with the cooperation of the aft section $434c_2$ of the two-sided protrusion 434c and the fore section $434c_1$ of the two-sided protrusion 434c with respective rotating portions 442a, 444a of the sealing members 442. 444.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A gas turbine engine, comprising:
a shaft rotatable about a rotation axis;
a housing extending around the shaft, the housing defining a cavity in the housing;
a bearing having an inner portion rotatable about the rotation axis and an outer portion rollingly engaged to the inner portion, the shaft extending through the inner portion of the bearing, a passage defined between the outer portion of the bearing and a first section of the housing, the passage extending from the cavity to an environment outside the cavity, an outer surface of the outer portion of the bearing facing an inner surface of the first section of the housing, the outer surface of the bearing and the inner surface of the first section of the housing defining a gap between the outer surface and the inner surface, the gap receiving a film of lubricant in the gap when the gas turbine engine is in use; and
a seal having a body and a wearable nose protruding from an annular surface of the body toward the outer portion of the bearing, the annular surface of the body facing toward a shoulder defined by a second section of the housing, the body of the seal sealingly engaging the second section of the housing, the wearable nose sealingly engaging the outer portion of the bearing, the wearable nose being:
made of a softer material than the outer portion of the bearing, and
biased against the outer portion of the bearing,
wherein, in an unworn state of the wearable nose, the annular surface of the body is spaced from the shoulder of the second section of the housing, and
in a worn state of the wearable nose, the annular surface of the body abuts the shoulder while the wearable nose maintains a sealing engagement with the outer portion of the bearing.

2. The gas turbine engine of claim 1, comprising a biasing member operatively connected to the second section of the housing and biasing the seal toward the outer portion of the bearing and thereby biasing the wearable nose against the outer portion of the bearing.

3. The gas turbine engine of claim 1, comprising a labyrinth seal having a first portion secured to the shaft and a second portion defined by the outer portion of the bearing, the first portion of the labyrinth seal sealingly engaging the second portion of the labyrinth seal.

4. The gas turbine engine of claim 3, wherein a radially inner surface of the second portion defined by the outer portion of the bearing sealingly engages a radially outer surface of the first portion of the labyrinth seal.

5. The gas turbine engine of claim 4, wherein the outer portion of the bearing includes an outer ring of the bearing rollingly engaged to the inner portion of the bearing and a member disposed radially between the inner surface of the first section of the housing and the outer ring, the member secured to the outer ring, the gap being located between an outer surface of the member and the inner surface of the first section of the housing.

6. The gas turbine engine of claim 5, wherein the member of the outer portion of the bearing includes a central portion and two side portions protruding from the central portion and located on opposite sides of the central portion, the central portion abutting the outer ring of the bearing, each of the two side portions defining a sealing face of a respective one of two labyrinth seals including the labyrinth seal.

7. The gas turbine engine of claim 6, comprising a second seal having a second wearable nose, the second seal sealingly engaged to a third section of the housing, the seal and the second seal disposed on opposite sides of the bearing, each of the two side portions in sealing engagement with a respective one of the wearable nose and the second wearable nose, the second wearable nose being made of the material softer than the outer portion of the bearing.

8. The gas turbine engine of claim 1, wherein the environment outside the cavity is a second cavity between the first section and a third section of the housing.

9. A gas turbine engine comprising:
a shaft rotatable about a rotation axis;
a housing extending circumferentially around the rotation axis and defining a cavity;
a bearing received within the cavity, the bearing having an inner portion secured to the shaft and an outer portion rollingly engaged to the inner portion, the inner portion rotatable relative to the outer portion about the rotation axis, the shaft extending through the inner portion of the bearing;
a gap between an outer surface of the outer portion of the bearing and an inner surface of a first section of the housing, the inner surface of the first section of the housing facing the outer surface of the outer portion of the bearing, the gap receiving a film of lubricant in the gap when the gas turbine engine is in use; and
a piston ring sealingly engaging a second section of the housing and axially movable relative to the second section of the housing about the rotation axis, the piston ring defining a wearable nose protruding from an annular surface of the piston ring toward the outer portion of the bearing, the annular surface facing a shoulder defined by the second section of the housing, the wearable nose made of a softer material than the outer portion of the bearing and biased in abutment against the outer portion of the bearing to create a sealing engagement between the wearable nose and the outer portion, the cavity sealed from an environment outside of the cavity via the sealing engagement between the wearable nose and the outer portion, wherein
in an unworn state of the wearable nose, the annular surface of the piston ring is spaced from the shoulder of the second section of the housing, and
in a worn state of the wearable nose, the annular surface of the piston ring abuts the shoulder of the second section of the housing while the wearable nose maintains sealing engagement with the outer portion of the bearing.

10. The gas turbine engine of claim 9, comprising a biasing member operatively connected to the second section of the housing and biasing the piston ring toward the outer portion of the bearing and thereby biasing the wearable nose against the outer portion of the bearing.

11. The gas turbine engine of claim 10, comprising a labyrinth seal having a first portion secured to the shaft and a second portion defined by the outer portion of the bearing, the first portion of the labyrinth seal sealingly engaging the second portion of the labyrinth seal.

12. The gas turbine engine of claim 11, wherein a radially inner surface of the second portion defined by the outer portion of the bearing sealingly engages a radially outer surface of the first portion of the labyrinth seal.

13. The gas turbine engine of claim 10, wherein the outer portion of the bearing includes an outer ring of the bearing rollingly engaged to the inner portion of the bearing and a member disposed radially between the inner surface of the first section of the housing and the outer ring, the member secured to the outer ring, the gap being located between an outer surface of the member and the inner surface of the first section of the housing.

14. The gas turbine engine of claim 13, wherein the member of the outer portion of the bearing includes a central portion and two side portions protruding from the central portion and located on opposite sides of the central portion, the central portion abutting the outer ring of the bearing, each of the two side portions defining a sealing face of a respective one of two labyrinth seals including the labyrinth seal.

15. The gas turbine engine of claim 14, comprising a second piston ring having a second wearable nose, the second piston ring sealingly engaged to a third section of the housing, the piston ring and the second piston ring disposed on opposite sides of the bearing, each of the two side portions in sealing engagement with a respective one of the wearable nose and the second wearable nose, the second wearable nose made of the material softer than the outer portion of the bearing.

16. The gas turbine engine of claim 9, wherein the environment outside the cavity is a second cavity between the first section and a third section of the housing.

17. A method of sealing a bearing cavity of a bearing housing of a gas turbine engine from an environment outside the bearing cavity, the bearing cavity containing a bearing, the method comprising:
rotating an inner portion of the bearing relative to an outer portion of the bearing;
damping movements of the bearing relative to the bearing housing by squeezing a film of lubricant disposed within a gap between an outer surface of the outer portion of the bearing and an inner surface of a first section of the bearing housing facing the outer surface of the outer portion of the bearing;
sealing the bearing cavity from the environment with a wearable nose biased in abutment against the outer portion of the bearing; and
wearing the wearable nose from an unworn state with the movements of the bearing relative to the bearing housing until the wearable nose reaches a worn state in which an annular surface of a piston ring from which the wearable nose protrudes becomes in abutment against a shoulder defined by a second section of the bearing housing, the annular surface of the piston ring is spaced from the shoulder of the second section of the bearing housing in the unworn state.

\* \* \* \* \*